United States Patent
Lee et al.

(10) Patent No.: US 9,059,656 B2
(45) Date of Patent: Jun. 16, 2015

(54) SWITCHING CONTROL APPARATUS FOR TWO PHASE SWITCHED RELUCTANCE MOTOR AND METHOD THEREOF

(71) Applicant: SAMSUNG ELECTRO-MECHANICS CO., LTD., Suwon (KR)

(72) Inventors: Guen Hong Lee, Suwon (KR); Han Kyung Bae, Suwon (KR); Hyung Joon Kim, Suwon (KR); Se Joo Kim, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 158 days.

(21) Appl. No.: 13/764,541

(22) Filed: Feb. 11, 2013

(65) Prior Publication Data

US 2013/0293181 A1 Nov. 7, 2013

(30) Foreign Application Priority Data

May 7, 2012 (KR) .......................... 10-2012-0048187

(51) Int. Cl.
*H02P 1/46* (2006.01)
*H02P 25/08* (2006.01)
*H02P 6/08* (2006.01)

(52) U.S. Cl.
CPC ................ *H02P 25/085* (2013.01); *H02P 6/08* (2013.01)

(58) Field of Classification Search
USPC .................................. 318/400.27, 701, 400.17
See application file for complete search history.

(56) References Cited

U.S. PATENT DOCUMENTS

| | | | | |
|---|---|---|---|---|
| 4,684,867 A | * | 8/1987 | Miller et al. ................... | 318/701 |
| 6,054,819 A | * | 4/2000 | Pengov ..................... | 318/254.2 |
| 6,822,417 B2 | * | 11/2004 | Kawaji et al. ................. | 318/701 |
| 2007/0278984 A1 | * | 12/2007 | Adra et al. .................... | 318/701 |
| 2009/0322264 A1 | * | 12/2009 | Imura ...................... | 318/400.09 |

FOREIGN PATENT DOCUMENTS

KR 1020100115209 10/2010

* cited by examiner

*Primary Examiner* — Kawing Chan
*Assistant Examiner* — Jorge L Carrasquillo
(74) *Attorney, Agent, or Firm* — Ladas & Parry, LLP

(57) ABSTRACT

Disclosed herein are a switching control apparatus for a two phase switch reluctance motor and a control method using the same. The switching control apparatus includes a rectifier; and an active converter including a pair of common switches, a pair of first phase switches, a pair of serially connected second phase switches, a plurality of current feedback diodes each connected to the switches, and a pair of drivers controlling the switches and operated as operation modes 1 to 3 to provide the commercial power provided from the rectifier to the two phase SRM and drive the two phase SRMs.

12 Claims, 8 Drawing Sheets

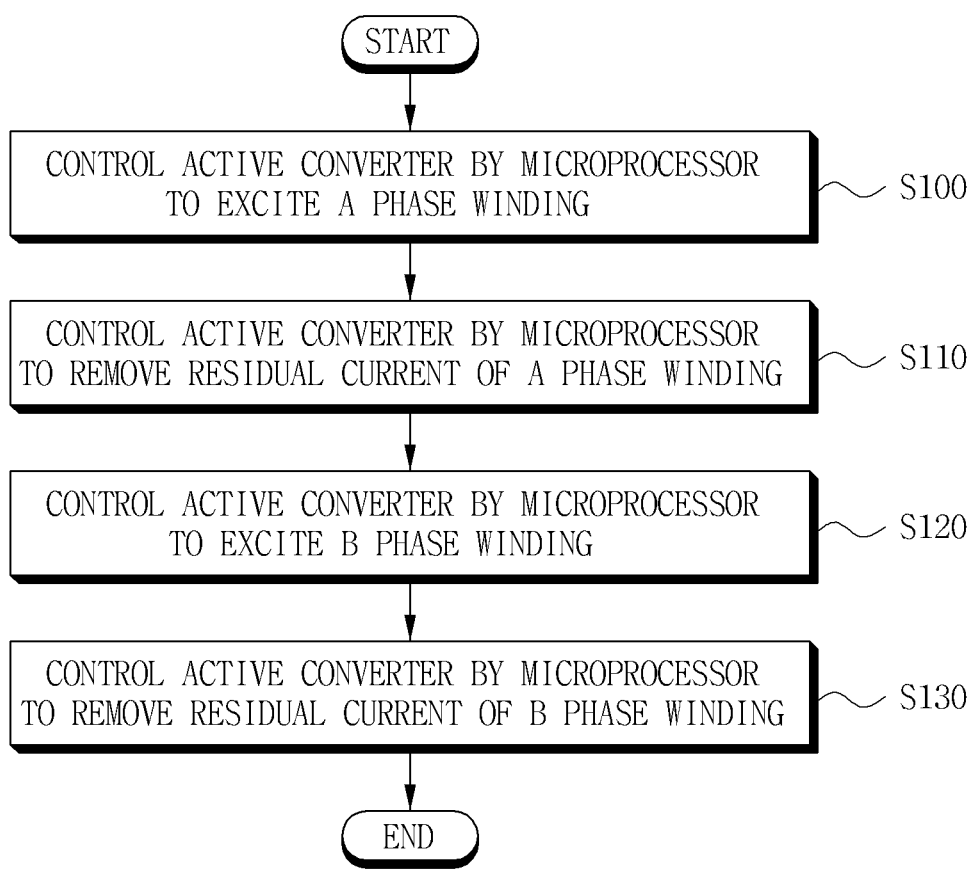

SWITCHING CONTROL APPARATUS FOR TWO PHASE SWITCHED RELUCTANCE MOTOR AND METHOD THEREOF

CROSS REFERENCE TO RELATED APPLICATION

This application claims the benefit of Korean Patent Application No. 10-2012-0048187, filed on May 7, 2012, entitled "Switching Control Apparatus For Two Phase Switched Reluctance Motor And Method Thereof", which is hereby incorporated by reference in its entirety into this application.

BACKGROUND OF THE INVENTION

1. Technical Field

The present invention relates to a switching control apparatus for a two phase switched reluctance motor and a method thereof.

2. Description of the Related Art

A switched reluctance motor (hereinafter, referred to as SRM) is a motor with which a switching control apparatus is coupled and includes a stator and a rotor having a salient pole type structure.

In particular, only a stator portion is wound with a winding and a rotor portion does not have any type of windings or permanent magnets and therefore, a structure of a motor is simplified.

Due to the characteristics of the structure, it is significantly advantageous in manufacturing and production. The switched reluctance motor has excellent characteristics such as good starting property and torque like a DC motor, little maintenance, torque per a unit volume, efficiency, rating of a converter, or the like. Therefore, the switched reluctance motor has been widely applied to various applications.

There are various types of switched reluctance motors such as a single phase, a two phase, a three phase, and the like. In particular, the two-phase SRM has been significantly interested in applications, such as a fan, a blower, a compressor, and the like, by having a simpler driving circuit than that of the three-phase SRM.

Further, the switching control apparatus for the two phase SRM has used various types for controlling current of a stator winding unidirectionally. There is the switching control apparatus using an asymmetric bridge converts for driving the existing AC motor using the used types.

The asymmetric bridge converter has two switches and diodes and has a three-stage operation mode.

Herein, operation mode 1 is a mode that turns-on two switches to apply DC power supply voltage to a winding and increase current, operation mode 2 is a mode that turns-off one of the two switches when current flows in a winding to circulate current to one diode and switch and a winding and slowly reduce current, and operation mode 3 is a mode that simultaneously turns-off two switches to rapidly reduce current.

The asymmetric bridge converter operated as described above have the most excellent diversity of control among converters for driving an SRM and independently controls current of each phase to impose current superimposing of two phases. Further, the asymmetric bridge converter is suitable for high voltage and large capacity and has relatively low rated voltage of a switch.

However, the switch control apparatus for the above-mentioned two phase SRM needs two wire leader lines for each phase and has a complicated connection of wires, which increases a difficulty in a circuit design.

In addition, manufacturing costs may be increased and a large manufacturing space may be needed, due to a plurality of independent diodes that separate from switch elements.

Patent Document

Korean Patent Laid-Open Publication No. 2010-0115209

SUMMARY OF THE INVENTION

The present invention has been made in an effort to provide a switching control apparatus and a method thereof capable of reducing the number of wire leader of a two phase switched reluctance motor while maintaining diversity of a control independence of a current control of each phase.

According to a preferred embodiment of the present invention, there is provided a switching control apparatus for a two phase switch reluctance motor, including: a rectifier rectifying commercial power; and an active converter including a pair of common switches having two phase windings of two phase SRMs commonly connected to a contact therebetween, a pair of serially connected first phase switches bridge-connected to the pair of common switches at any one of the two phase windings, a pair of serially connected second phase switches bridge-connected to the pair of common switches at the other one of the two phase windings, a plurality of current feedback diodes each connected to the switches, and a pair of drivers controlling the switches and operated as operation modes 1 to 3 to provide the commercial power provided from the rectifier to the two phase SRM and drive the two phase SRMs.

The switching control apparatus for a two phase switch reluctance motor may further include: a microprocessor sensing a position and a speed of the two phase SRM to control the pair of drivers of the active converter and drive the two phase SRM.

The pair of drivers may be configured to include a first driver and a second driver, the first driver may controls a switch positioned at one side of the two phase SRM, and the second driver may controls a switch positioned at the other side of the two phase SRM.

The pair of common switches may be configured of an upper common switch and a lower common switch connected with each other in series and the two phase windings of the two phase SRM is connected to a contact thereof.

The pair of first phase switches is configured of an upper first phase switch and a lower first phase switch connected with each other in series and any one of the two phase windings of the two phase SRM is connected to a contact thereof, and the pair of second phase switches may be configured of an upper second phase switch and a lower second phase switch connected to each other in series and the other one of the two phase windings of the two phase SRMs is connected to a contact thereof.

The upper first common switch and the lower first phase switch may be turned-on and are operated as operation mode 1 for any one phase winding of the two phase SRM, and the lower first common switch and the upper second phase switch may be turned-on and operated as the operation mode 1 for the other one phase winding of the two phase SRM.

The current feedback diode connected to the upper lower first common switch and the current feedback diode connected to the upper first phase switch may be operated as operation mode 3 for any one phase windings of the two phase SRM and the current feedback diode connected to the upper first common switch and the lower second phase switch may be turned-on and operated as operation mode 3 for any one phase winding of the two phase SRM.

The current feedback diode connected to the upper first phase switch may provide a circulating path of residual current in a state in which the upper first common switch is turned-on and is operated as operation mode 2 for any one phase winding of the two phase SRM, and the current feedback diode connected to the upper first common switch may provide the circulation path of the residual current in a state in which the second phase switch is turned-on and is operated as operation mode 2 for any one phase winding of the two phase SRM The microprocessor may perform a control to change the active converter from the operation mode 1 to the operation mode 2.

The microprocessor may perform a control to change the active converter from the operation mode 1 to the operation mode 3 and the operation mode 2.

The microprocessor may perform a control to repeat a process in which the active converter is changed from the operation mode 1 to the operation mode 3.

The microprocessor may perform a control to repeat a process in which the active converter is changed from the operation mode 1 to the operation mode 2.

According to another preferred embodiment of the present invention, there is provided a switching control method for a two phase switch reluctance motor, including: (A) controlling, by a microprocessor, an active converter including a plurality of switches bridge-connected to each phase winding of a two phase SRM, a plurality of current feedback diodes each connected to the switches, and a pair of driver splitting and controlling the plurality of switches, to excite any one of the phase windings and remove residual current; and (B) controlling, by the microprocessor, the active converter to excite the other one phase winding and remove the residual current.

The pair of drivers may be configured to include a first driver and a second driver, the first driver may control switches positioned at one side of the two phase SRM, and the second driver may control switches positioned at the other side of the two phase SRM.

The plurality of switches may include: a pair of common switches commonly connected to two phase windings of two phase SRMs; a pair of first phase switches bridge-connected to the pair of common switches at any one of the two phase windings; and a pair of second phase switches bridge-connected to the pair of common switches at the other one of the two phase windings.

In the control of the active converter of the steps (A) and (B), the microprocessor may perform a control to change the active converter from the operation mode 1 to the operation mode 2.

In the control of the active converter of the steps (A) and (B), the microprocessor may perform a control to change the active converter from the operation mode 1 to the operation mode 3 and the operation mode 2.

The microprocessor may perform a control to repeat a process in which the active converter is changed from the operation mode 1 to the operation mode 3.

BRIEF DESCRIPTION OF THE DRAWINGS

The above and other objects, features and advantages of the present invention will be more clearly understood from the following detailed description taken in conjunction with the accompanying drawings, in which:

FIG. 9 is a flow chart of a switching control method for the two phase switched reluctance motor according to the first preferred embodiment of the present invention.

DESCRIPTION OF THE PREFERRED EMBODIMENTS

Figure 1:
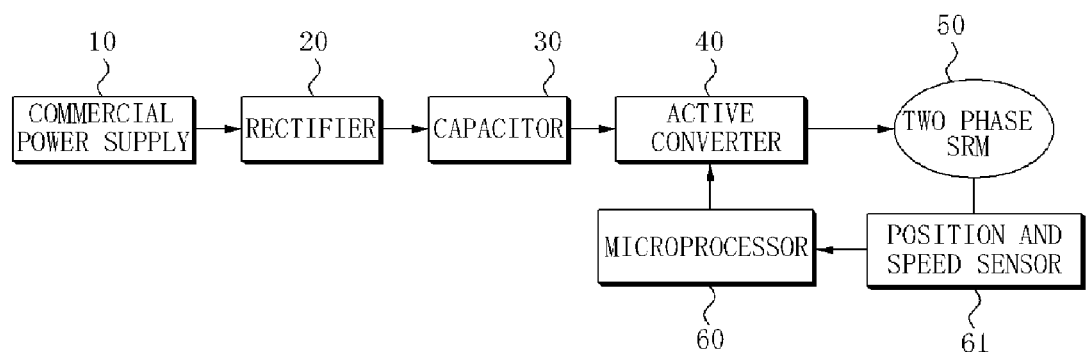
FIG. 1 is a configuration diagram of a switching control apparatus for a two phase switched reluctance motor according to a first preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a configuration diagram of a switching control apparatus for a two phase switched reluctance motor according to a first preferred embodiment of the present invention.

Referring to FIG. 1, a switching control apparatus for a two phase switch reluctance motor according to a first preferred embodiment of the present invention is configured to include a rectifier 20 that rectifies commercial power 10 and supplies DC power, a capacitor 30 that is connected to the rectifier 20, an active converter 40 that is connected to the capacitor 30, and a microprocessor 60 that senses a position and a speed of a two phase SRM 50 to control the active converter 40.

The rectifier 20 rectifies the input commercial power 10 and supplies the rectified power to the capacitor 30. Further, the capacitor 30 improves a power factor of the rectified voltage and absorbs noise and supplies power to the active converter 40.

The active converter 40 includes a switch element unit that is configured of six switch elements connected in a two phase bridge type, a plurality of current feedback diodes reversely connected between each input end and output end of the switch elements, and first and second drivers that turn-on/off the switch elements and is operated as operation modes 1 to 3 according to the control of the microprocessor 60 to drive the two phase SRM 50.

Meanwhile, the microprocessor 60 senses the position and speed of the two phase SRM 50 using a position and speed sensor (61) to control the first driver and the second driver of the active converter 40, such that the switches are operated as operation modes 1 to 3, thereby driving the two phase SRM 50.

Herein, the operation mode 1 applies positive reference voltage to the corresponding phase winding of the two phase SRM 50 to increase current flowing in a winding, the operation mode 2 circulates current to the winding when current flows in the winding to slowly reduce current, and the operation mode 3 applies negative reference voltage to the corresponding phase winding to rapidly reduce current.

The switching control apparatus for the two phase switched reluctance motor configured as above is operated as follows.

First, the microprocessor 60 controls the active converter 40 to be operated in the operation modes 1 to 3 to excite any one of the two phase windings of the two phase SRM 50 and then, end the exciting state.

To be continued, the microprocessor 60 controls the active converter 40 to be operated in the operation modes 1 to 3 to excite the other of the two phase windings of the two phase SRM 50 and then, end the exciting state.

Next, the microprocessor 60 repeatedly performs the operation to drive the two phase SRM 50.

In this case, the microprocessor 60 controls the active converter 40 to be operated at operation modes 1 to 3 and can control the active converter 40 in various types.

For example, the microprocessor 60 controls the active converter 40 using a first switching type that performs a control to change the operation mode 1 to the operation mode 2, a second switching type that performs a control to change the operation mode 1 to the operation mode 3 and the operation mode 2, or a third switching type that performs a control to change the operation mode 1 to the operation mode 2, again to the operation mode 1, and again to the operation mode 2, and repeats the operation modes 1 and 2.

Figure 2:
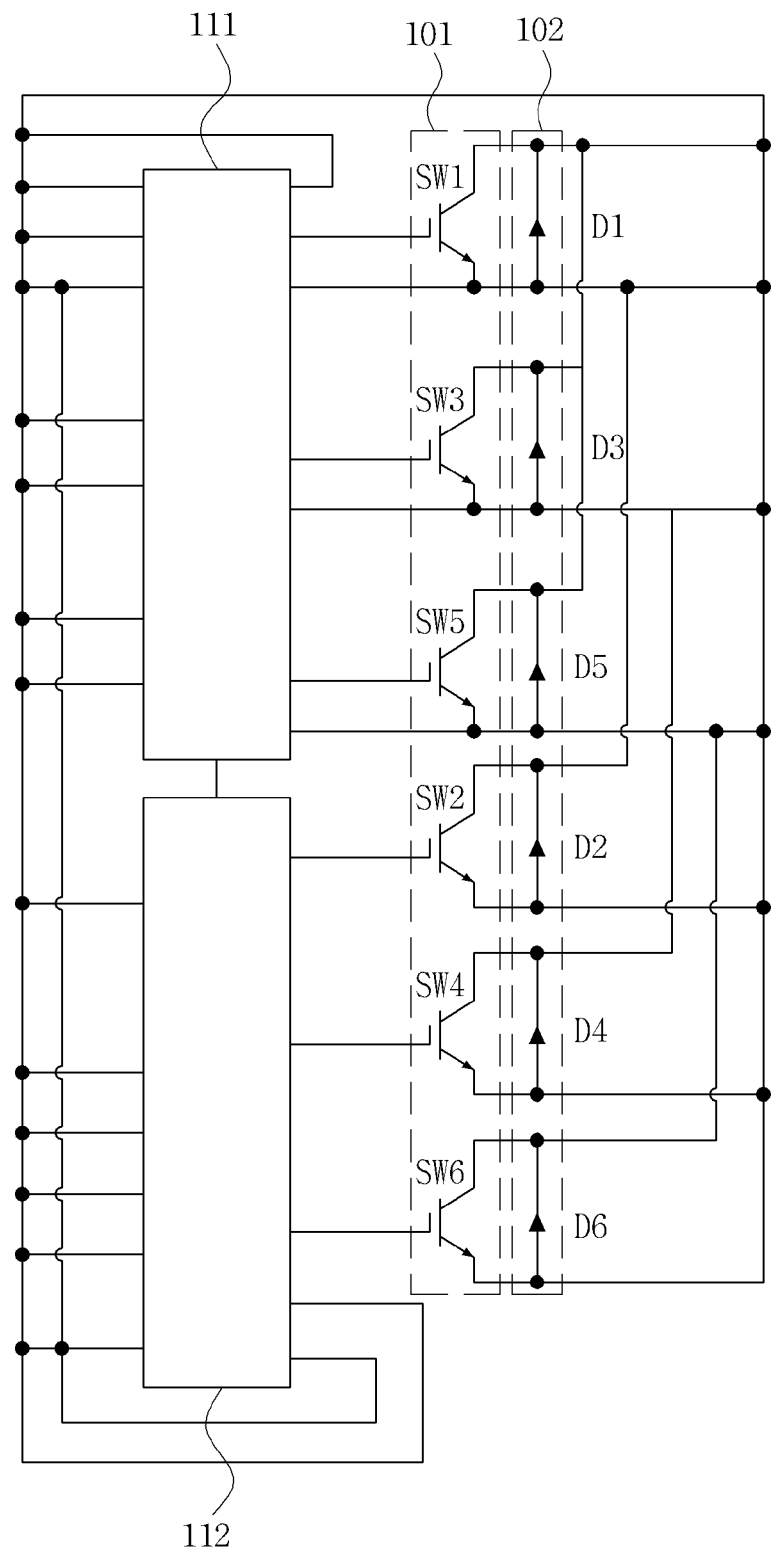
FIG. 2 is a detailed configuration diagram of an active converter of FIG. 1.
Figure 3:
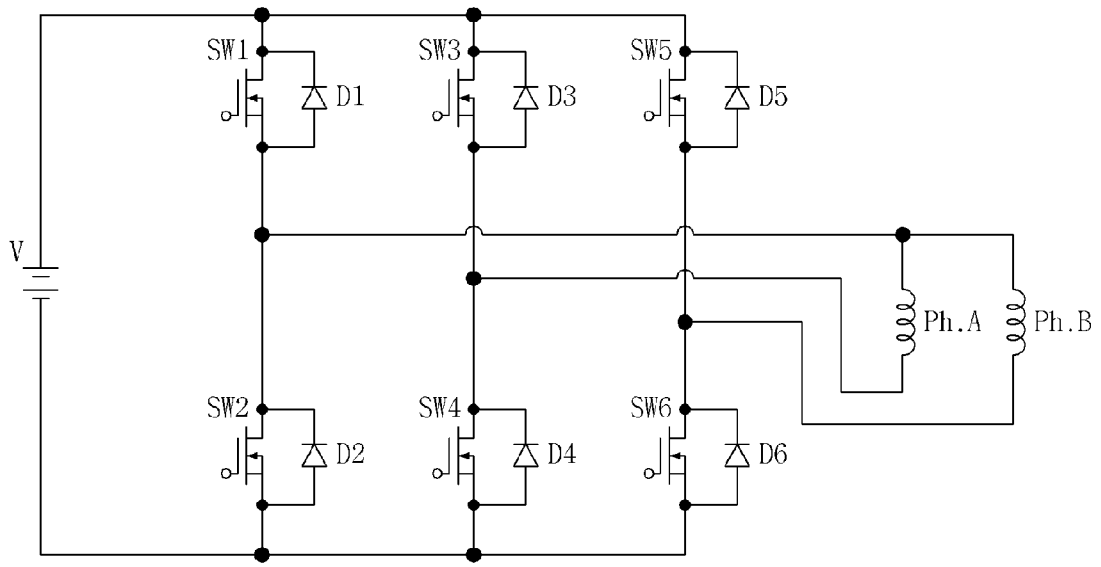
FIG. 3 is a diagram showing a phase winding and a connection relation of wires of a two phase SRM of a switch unit of FIG. 2.

FIG. 2 is an internal configuration diagram of the active converter of FIG. 1 and FIG. 3 is a diagram showing the phase winding and the connection relation of wires of the two phase SRM of the switch unit of FIG. 2.

Referring to FIGS. 2 and 3, the active converter according to the preferred embodiment of the present invention includes a switch element unit 101 that is configured six switches SW1 to SW6 connected in a three phase bridge type, a plurality of current feedback diodes D1 to D6 that are reversely connected between each input end and output end of the switch elements, and first and second drivers 111 and 112 that turn-on/off the switching elements.

Herein, the plurality of switches SW1 to SW6 are configured of BJT, but may be configured of each MOSFET. In this case, the plurality of current feedback diodes D1 to D6 may each be configured of body diodes reversely connected between drains and sources of the corresponding MOSFETs. In this case, the body diodes cannot be separated from each other due to inherent characteristics of the MOSFET.

In the switch elements SW1 to SW6, 'SW1' and 'SW2', 'SW3' and 'SW4', and 'SW5' and 'SW6' are each connected with each other in series and each thereof is configured in parallel.

Here, the 'SW1', 'SW3', and 'SW5' are positioned at a front end of the two phase SRM 50 at the time of driving the two phase SRM 50 and the 'SW2', 'SW4', and 'SW6' are positioned at a back end of the two phase SRM 50.

That is, a connection point between the switch elements SW1 and SW2 is connected to both of the two phase windings of the two phase SRM 50, a connection point between the switch elements SW3 and SW4 is connected one phase winding of the two phase SRM 50, and a connection point between the switch elements SW5 and SW6 is connected to the other phase winding of the two phase SRM 50.

Next, the first and second drivers 111 and 112 each turn-on/off the corresponding switches SW1 to SW6 according o the control of the microprocessor 60.

As described above, when the first and second drivers 111 and 112 drive the two phase SRM 50, turning-on/off the connected switches SW1 to SW6 can each switch the flow of current introduced into each coil of the two phase SRM 50 and the flow of current discharged from each coil, such that the two phase SRM 50 can be driven.

Figure 4A:
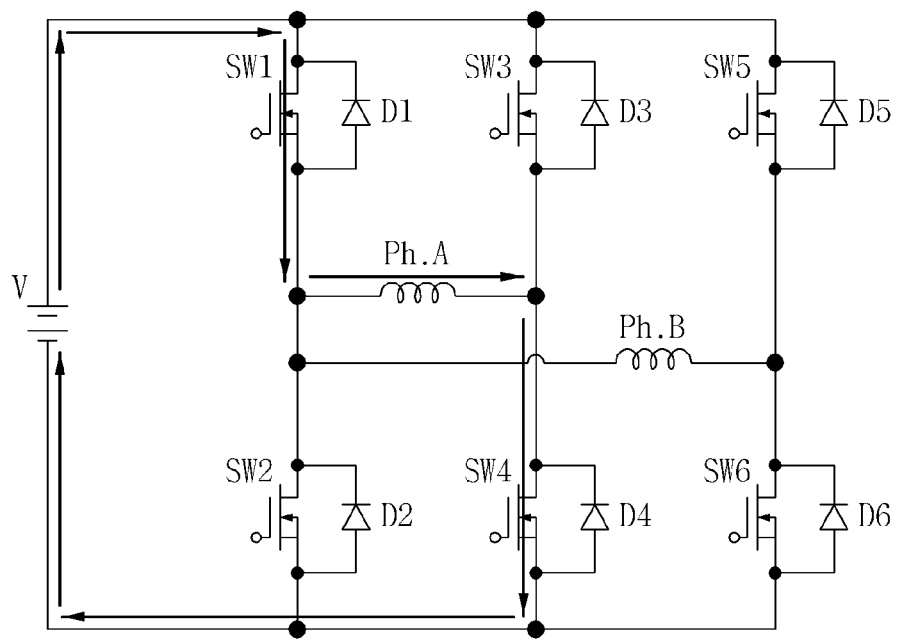
FIGS. 4A to 4C are diagrams showing operation modes 1 to 3 for an A phase winding of an active converter.

In the configuration of the active converter 40, as shown in FIG. 4A, one SW1 of the common switches SW1 and SW2 and one SW4 of the pair of first phase switches SW3 and SW4 are switched-on and is operated as the operation mode 1, thereby exciting the A phase winding.

Figure 4B:
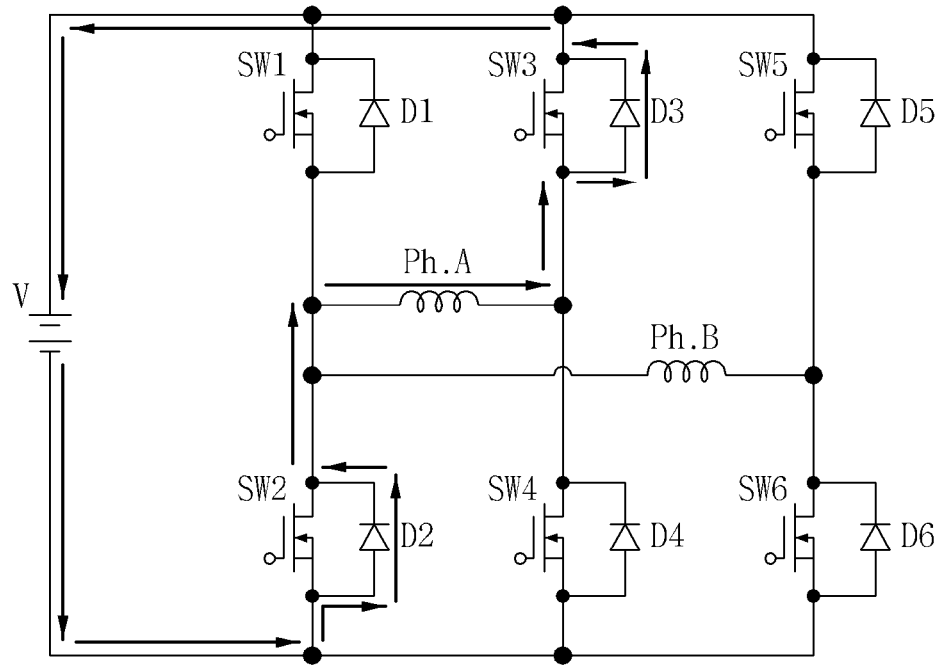

In addition, as shown in FIG. 4B, one D2 of the current feedback diodes D1 and D2 that are formed in the pair of common switches SW1 and SW2 and one D3 of the current feedback diodes D3 and D4 that are formed in the pair of first phase switches SW3 and SW4 are used to return the residual current to the power supply side.

Figure 4C:
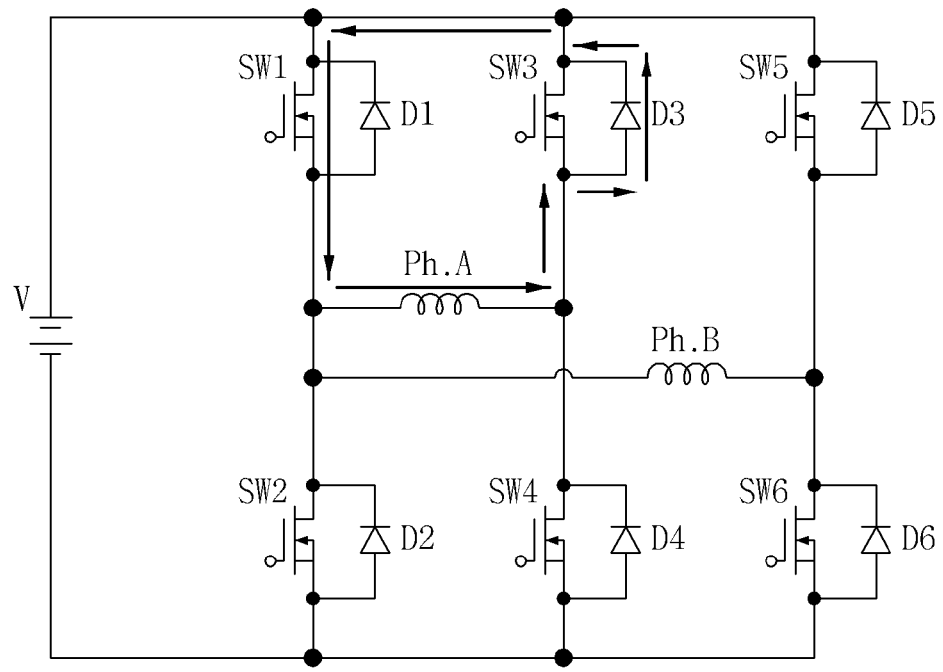

Further, as shown in FIG. 4C, when one SW1 of the common switches SW1 and SW2 of the active converter 40 is switched-on, one D3 of the current feedback diodes D3 and D4 that are formed in the pair of first phase switches SW3 and SW4 is operated as the operation mode 2, thereby circulating the residual current of the A phase winding.

Figure 5A:
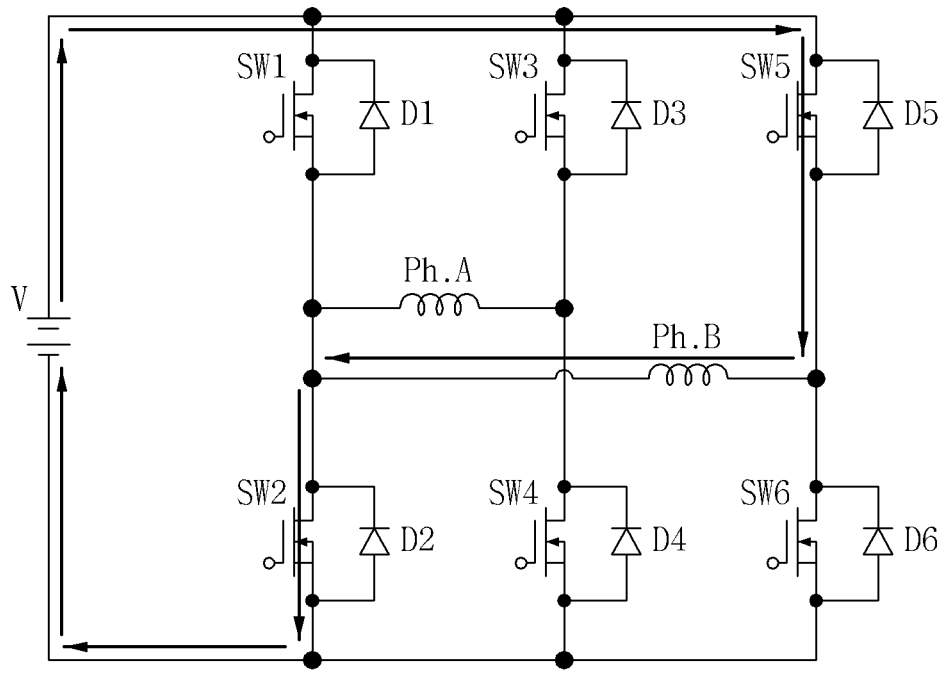
FIGS. 5A to 5C are diagrams showing operation modes 1 to 3 for a B phase winding of the active converter.

Similarly, as shown in FIG. 5A, even in the case of phase B, one SW2 of the pair of common switches SW1 and SW2 and one SW5 of the pair of second phase switches SW5 and SW6 are switched-on and is operated as the operation mode 1, thereby exciting the B phase winding.

Figure 5B:
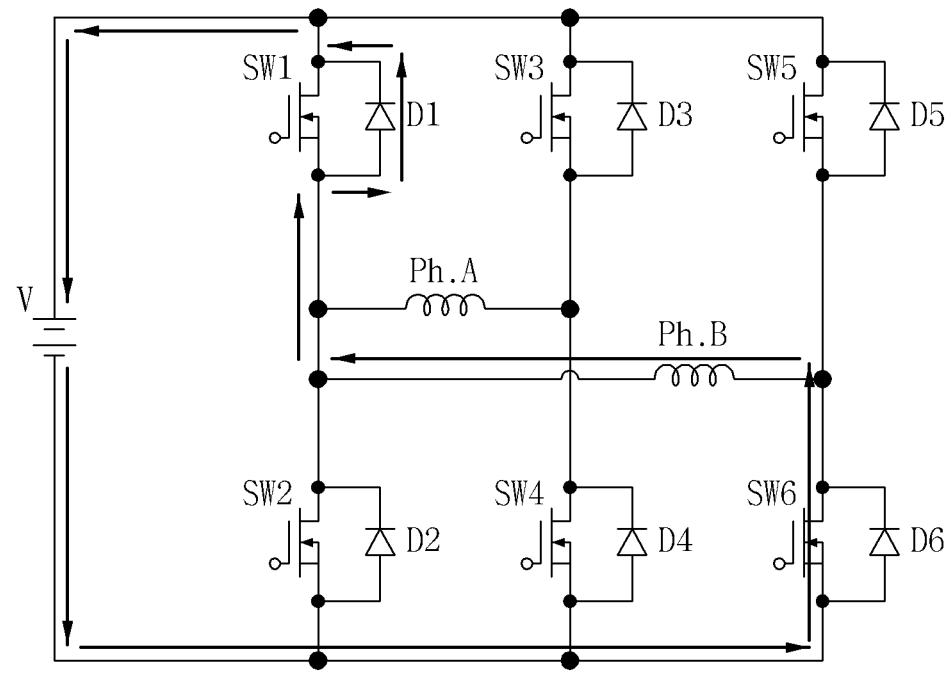

In addition, as shown in FIG. 5B, one D1 of the current feedback diodes D1 and D2 that are formed in the pair of common switches SW1 and SW2 and one D6 of the current feedback diodes D5 and D6 that are formed in the pair of second phase switches SW5 and SW6 are used to return the residual current to the power supply side.

Figure 5C:
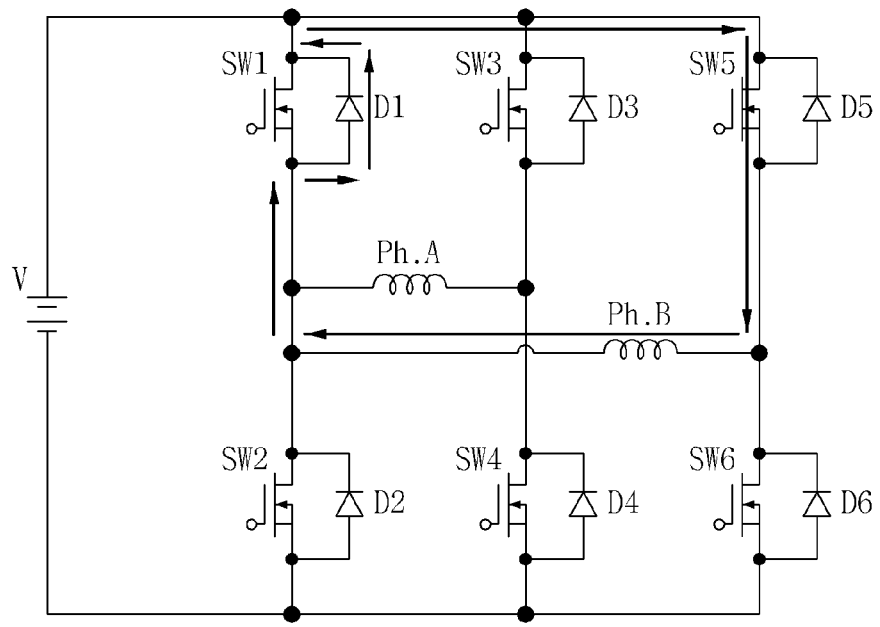

Further, as shown in FIG. 5C, when one SW5 of the second phase switches SW5 and SW6 of the active converter 40 is switched-on, one D1 of the current feedback diodes D1 and D2 that are formed in the pair of common switches SW1 and SW2 is operated as the operation mode 2, thereby circulating the residual current of the B phase winding.

As described above, modes 1 to 3 are formed by cooperating the pair of common switches SW1 and SW2 and the pair of first phase switches SW3 and SW4 and modes 1 to 3 are formed by cooperating the pair of common switches SW1 and SW2 and the pair of second phase switches SW5 and SW6, thereby performing various controls.

For example, the switching control apparatus for the switched reluctance motor uses the first switching type using modes 1 and 2.

Figure 6:
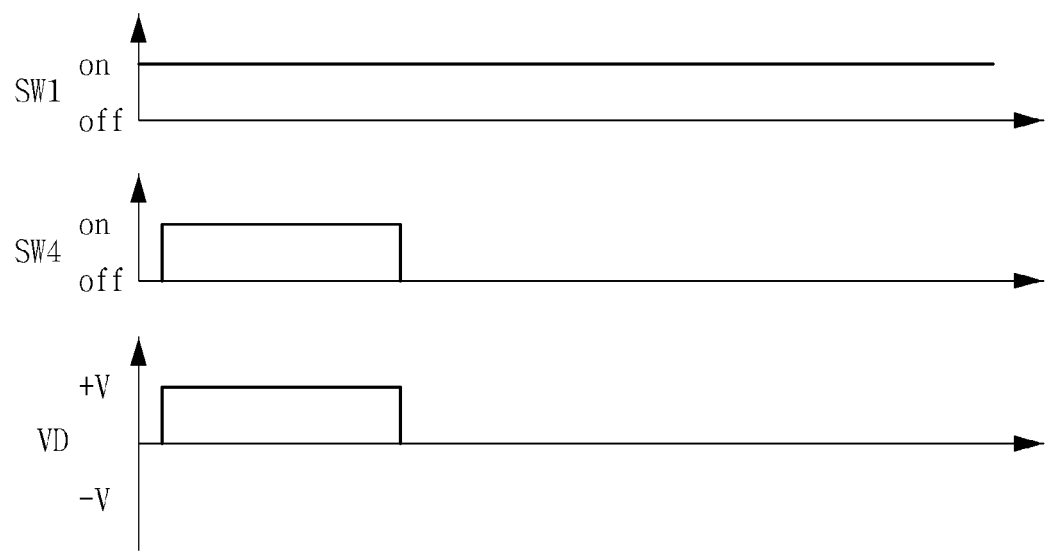
FIG. 6 is a waveform diagram for describing a first switching type of the active converter of FIG. 1.

Describing this in more detail, as shown in FIG. 6, the switching control apparatus switches-on the upper common switch SW1 of the common switches SW1 and SW2 and the lower first phase switch SW4 of the pair of first phase switches SW3 and SW4 switches-on to be operated as the operation mode 1, such that voltage VD is applied to the A phase winding as reference voltage V, thereby exciting the A phase winding.

Next, as shown in FIG. 6, the upper common switch SW1 of the common switches SW1 and SW2 is maintained in a turn-on state and the lower first phase switch SW4 of the pair of first phase switches SW3 and SW4 is turned-off after a predetermined time lapses to change the operation mode from the operation mode 1 to the operation mode 2, thereby circulating the residual current to the A phase winding through the current feedback diode D3 connected to the upper second phase switch SW3. Thereafter, current induced to the A phase winding is converged to 0 over time.

The operation is similarly applied even to the B phase. First, the switching control apparatus switches-on the lower common switch SW2 of the common switches SW1 and SW2 and the upper second phase switch SW5 of the pair of second phase switches SW5 and SW6 switches-on to be operated as the operation mode 1, such that the reference voltage is applied to the B phase winding, thereby exciting the B phase winding.

Thereafter, the upper second phase switch SW5 of the pair of second phase switches SW5 and SW6 is maintained in a turn-on state and the lower common switch SW2 of the common switches SW1 and SW2 is changed to a turn-off state after the predetermined time lapses to change the operation mode from the operation mode 1 to the operation mode 2, thereby circulating the residual current to the B phase winding through the current feedback diode D1 connected to the upper common switch SW1. Thereafter, current induced to the B phase winding is converged to 0 over time.

According to the first switching type, the reference voltage and 0 voltage are applied to the phase winding, such that the following is well made in a current rising section and a flat section.

As another control type, the switching control apparatus may implement the second switching type using modes 1 to 2.

Figure 7:
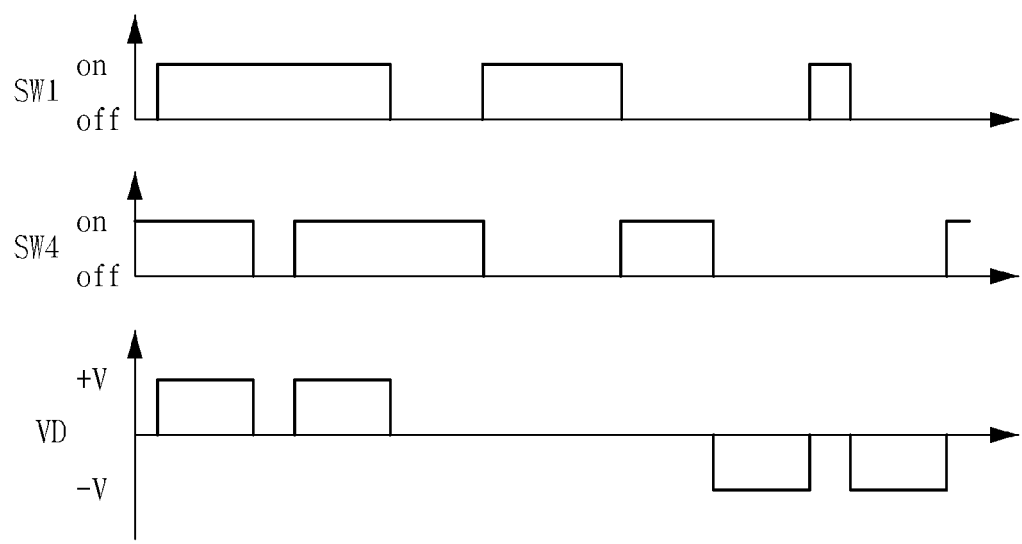
FIG. 7 is a waveform diagram for describing a second switching type of the active converter of FIG. 1.

Describing this in more detail, as shown in FIG. 7, the upper common switch SW1 of the common switches SW1 and SW2 maintains a turn-on state for the predetermined time and the lower first phase switch SW4 is changed from a turn-on state to a turn-off state and again to a turn-on state during the period to change the operation mode from the operation mode 1 to the operation mode 2 and again to the operation mode 1 to apply the reference voltage to the A phase winding, thereby exciting the A phase winding.

Thereafter, the upper common switch SW1 is changed to a turn-off state and then, a turn-on state and again to a turn-off state. In this case, the lower first phase switch SW4 is reversely operated to be in the operation mode 2 state, thereby circulating the residual current of the A phase winding.

In addition, the lower first phase switch SW4 is maintained at the turn-off state and the upper common switch SW1 is changed from the turn-off state to the turn-on state and again to the turn-off state to be operated in the operation mode 3, the operation mode 2, and again in the operation mode 3, thereby returning the residual current of the A phase winding to the power supply side.

The operation is similarly applied even to the B phase. First, the lower common switch SW2 of the common switches SW1 and SW2 maintains a turn-on state for the predetermined time and the upper second phase switch SW5 is changed from a turn-on state to a turn-off state and again to a turn-on state during the period to change the operation mode from the operation mode 1 to the operation mode 2 and again to the operation mode 1 to apply the reference voltage to the B phase winding, thereby exciting the B phase winding.

Thereafter, the lower common switch SW2 is changed to a turn-off state and then, a turn-on state and again to a turn-off state and the upper second phase switch SW5 is reversely operated to be in the operation mode 2 state, thereby circulating the residual current of the B phase winding.

In addition, the lower second phase switch SW6 is maintained at the turn-on state and the upper common switch SW1 is changed from the turn-off state to the turn-on state and again to the turn-off state to be operated in the operation mode 3, the operation mode 2, and again in the operation mode 3, thereby returning the residual current of the B phase winding to the power supply side.

The second switching type well performs the current following in the current rising period and the current falling period.

As another control type, the switching control apparatus may implement a third switching type using modes 1 to 2.

Figure 8:
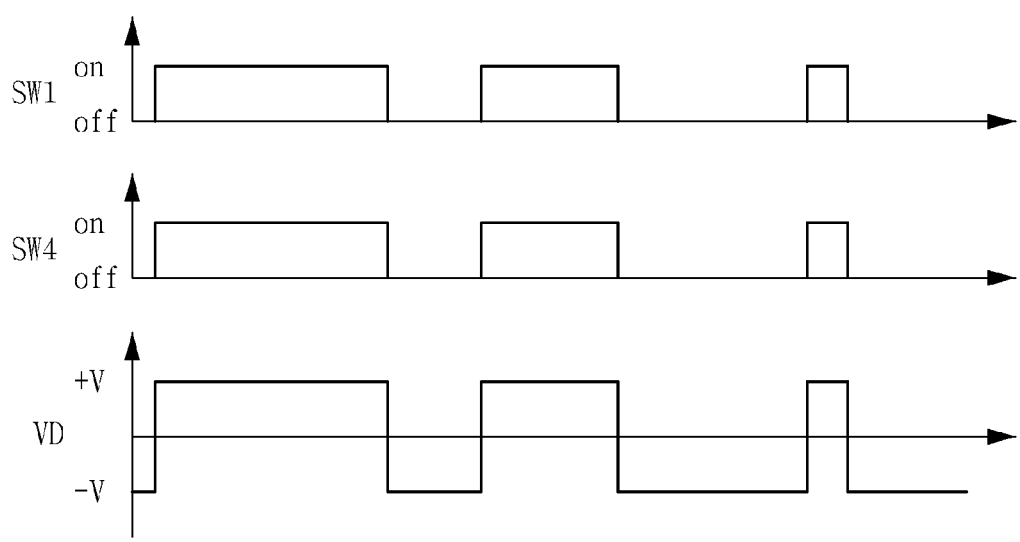
FIG. 8 is a waveform diagram for describing a third switching type of the active converter of FIG. 1.

Describing this in more detail, as shown in FIG. 8, the upper common switch SW1 of the common switches SW1 and SW2 is turned-on and the lower first phase switch SW4 is turned-on and is in the operation mode 1 to apply the reference voltage to the A phase winding, thereby exciting the A phase winding.

Thereafter, the upper common switch SW1 and the lower first phase switch SW4 are turned-off and is changed to the operation mode 2 after the predetermined time lapses, thereby circulating the residual current to the A phase winding.

In addition, the upper common switch SW1 of the common switches SW1 and SW2 is turned-on and the lower first phase switch SW4 is turned-on after the predetermined time lapses to be in the operation mode 1 to apply the reference voltage to the A phase winding, thereby exciting the A phase winding. In this case, the turn-on time is shorter than the previous turn-on time.

Thereafter, the upper common switch SW1 and the lower first phase switch SW4 are turned-off and is changed to the operation mode 2 when the predetermined time lapses, thereby circulating the residual current to the A phase winding. In this case, the turn-off time is longer than the previous turn-off time.

In addition, the upper common switch SW1 of the common switches SW1 and SW2 is turned-on and the lower first phase switch SW4 is turned-on after the predetermined time lapses to be in the operation mode 1 to apply the reference voltage to the A phase winding, thereby exciting the A phase winding. In this case, the turn-on time is shorter than the previous turn-on time.

Thereafter, the upper common switch SW1 and the lower first phase switch SW4 are turned-off and is changed to the operation mode 2 when the predetermined time lapses, thereby circulating the residual current to the A phase winding. In this case, the turn-off time becomes residual time.

The operation is similarly applied even to the B phase. Here, the lower common switch SW2 of the common switches SW1 and SW2 is turned-on and the upper second phase switch SW5 is turned-on and is in the operation mode 1 to apply the reference voltage to the B phase winding, thereby exciting the B phase winding.

Thereafter, the lower common switch SW2 is turned-off and the lower second phase switch SW6 is turned-on after the predetermined time lapses to be changed to the operation mode 2, thereby circulating the residual current to the B phase winding.

In addition, the lower common switch SW2 of the common switches SW1 and SW2 is turned-on and the upper second phase switch SW5 is turned-on after the predetermined time lapses to be in the operation mode 1 to apply the reference voltage to the B phase winding, thereby exciting the B phase winding. In this case, the turn-on time is shorter than the previous turn-on time.

Thereafter, the upper common switch SW1 is turned-off and the lower second phase switch SW6 is turned-on after the predetermined time lapses to be changed to the operation mode 2, thereby circulating the residual current to the B phase winding. In this case, the turn-off time is longer than the previous turn-off time.

In addition, the lower common switch SW1 of the common switches SW1 and SW2 is turned-on and the upper second phase switch SW5 is turned-on after the predetermined time lapses to be in the operation mode 1 to apply the reference voltage to the B phase winding, thereby exciting the B phase winding. In this case, the turn-on time is shorter than the previous turn-on time.

Thereafter, the lower common switch SW2 is turned-off and the lower second phase switch SW6 is turned-on after the predetermined time lapses to be changed to the operation mode 2, thereby circulating the residual current to the A phase winding. In this case, the turn-off time becomes residual time.

According to the third switching type, it is possible to obtain current characteristics having excellent performance during a flat period.

Meanwhile, according to the preferred embodiment of the present invention, it is possible to reduce the number of wire leaders of the two phase switched reluctance motor from 3 to 2. Therefore, it is possible to simplify the connection of wires and has advantages in a circuit design.

In addition, according to the preferred embodiment of the present invention, it is possible to make the diversity of a control excellent by connecting four switches for each phase.

Further, according to the preferred embodiments of the present invention, it is possible to implement the current superimposing by performing the independent control for each phase.

Moreover, according to the preferred embodiments of the present invention, it is possible to commonly use the three phase inverter according to the prior art with the switching apparatus according to the present invention.

FIG. 9 is a flow chart of a switching control method for a switched reluctance motor according to the first preferred embodiment of the present invention.

Referring to FIG. 9, the microprocessor controls the active converter to excite the A phase winding of the two phase SRM (S100).

Next, the microprocessor controls the active converter to remove the residual current of the A phase winding of the two phase SRM (S110).

As the switching type that allows the microprocessor to control the active converter so as to perform the operation, there are the first switching type, the second switching type, the third switching type, and the like, as described above.

Here, according to the first switching type, the reference voltage and 0 voltage are applied to the phase winding, such that the following is well made in a current rising section and a flat section.

Further, the second switching type well performs the current following in the current rising period and the current falling period.

Next, according to the third switching type, it is possible to obtain current characteristics having excellent performance during a flat period.

The user selects types suitable for applications in consideration of advantages of the above-mentioned types and uses the microprocessor to operate the active converter by the corresponding type.

Continuously, the microprocessor controls the active converter to excite the B phase winding of the two phase SRM (S120).

Next, the microprocessor controls the active converter to remove the residual current of the B phase winding of the two phase SRM (S130).

As the switching type that allows the microprocessor to control the active converter so as to perform the operation, there are the first switching type, the second switching type, the third switching type, and the like, as described with reference to the A phase winding.

According to the preferred embodiment of the present invention as described above, even in the state in which the number of wire leaders of the two phase switched reluctance motor is reduced from 3 to 2, four switches are connected with each other for each phase, thereby making the diversity of control excellent.

Further, according to the preferred embodiments of the present invention, it is possible to implement the current superimposing by performing the independent control for each phase.

Moreover, according to the preferred embodiments of the present invention, it is possible to commonly use the three phase inverter according to the prior art with the switching apparatus according to the present invention.

According to the preferred embodiments of the present invention, it is possible to reduce the number of wire leaders of the two phase switched reluctance motor from 3 to 2. Therefore, it is possible to simplify the connection of wires and has advantages in a circuit design.

In addition, according to the preferred embodiments of the present invention, it is possible to make the diversity of a control excellent by connecting four switches for each phase.

Further, according to the preferred embodiments of the present invention, it is possible to implement the current superimposing by performing the independent control for each phase.

Moreover, according to the preferred embodiments of the present invention, it is possible to commonly use the three phase inverter according to the prior art with the switching apparatus according to the present invention.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A switching control apparatus for a two phase switch reluctance motor (SRM), comprising:
a rectifier rectifying commercial power; and
an active converter including a pair of common switches having two phase windings of two phase SRMs commonly connected to a contact therebetween, a pair of serially connected first phase switches bridge-connected to the pair of common switches at any one of the two phase windings, a pair of serially connected second phase switches bridge-connected to the pair of common switches at the other one of the two phase windings, a plurality of current feedback diodes each connected to the switches, and a pair of drivers controlling the switches and operated as operation modes 1 to 3 to provide the commercial power provided from the rectifier to the two phase SRM and drive the two phase SRMs, wherein the operation mode 1 applies positive reference voltage to the corresponding phase winding of the two phase SRM to increase current flowing in the winding, the operation mode 2 circulates current to the winding when current flows in the winding to slowly reduce current, and the operation mode 3 applies negative reference voltage to the phase winding to rapidly reduce current, and wherein for the active converter, one of the common switches maintains a turn-on state for a predetermined time and one of the first phase switches is changed from a turn-on state to a turn-off state and again to a turn-on state during the period to change the operation mode from the operation mode 1 to the operation mode 2 and again to the operation mode 1 to apply the reference voltage to one of the phase windings, thereby exciting the one of the phase windings.

2. The switching control apparatus for a two phase switch reluctance motor as set forth in claim 1, further comprising: a microprocessor sensing a position and a speed of the two phase SRM to control the pair of drivers of the active converter and drive the two phase SRM.

3. The switching control apparatus for a two phase switch reluctance motor as set forth in claim 1, wherein the pair of drivers is configured to include a first driver and a second driver, the first driver controls switches positioned at one side of the two phase SRM, and the second driver controls switches positioned at the other side of the two phase SRM.

4. The switching control apparatus for a two phase switch reluctance motor as set forth in claim 1, wherein the pair of common switches is configured of an upper common switch and a lower common switch connected with each other in series and the two phase windings of the two phase SRM is connected to a contact thereof, the pair of first phase switches is configured of an upper first phase switch and a lower first phase switch connected with each other in series and any one of the two phase windings of the two phase SRM is connected to a contact thereof, and the pair of second phase switches is configured of an upper second phase switch and a lower second phase switch connected to each other in series and the other one of the two phase windings of the two phase SRMs is connected to a contact thereof.

5. The switching control apparatus for a two phase switch reluctance motor as set forth in claim 4, wherein the current feedback diode connected to the lower first common switch and the current feedback diode connected to the upper first phase switch are operated as operation mode 3 for any one phase windings of the two phase SRM, and the current feedback diode connected to the upper first common switch and the lower second phase switch are turned-on and are operated as operation mode 3 for any one phase winding of the two phase SRM.

6. The switching control apparatus for a two phase switch reluctance motor as set forth in claim 4, wherein the current feedback diode connected to the upper first phase switch provides a circulating path of residual current in a state in which the upper first common switch is turned-on and is operated as operation mode 2 for any one phase winding of the two phase SRM, and the current feedback diode connected to the upper first common switch provides the circulation path of the residual current in a state in which the upper second phase switch is turned-on and is operated as operation mode 2 for any one phase winding of the two phase SRM.

7. The switching control apparatus for a two phase switch reluctance motor as set forth in claim 1, wherein the upper first common switch and the lower first phase switch are turned-on and are operated as operation mode 1 for any one phase winding of the two phase SRM, and the lower first common switch and the upper second phase switch are turned-on and are operated as the operation mode 1 for the other one phase winding of the two phase SRM.

8. The switching control apparatus for a two phase switch reluctance motor as set forth in claim 1, wherein thereafter said one of the common switches is changed to a turn-off state and then, a turn-on state and again to a turn-off state and said one of the first phase switches is reversely operated to be in the operation mode 2, thereby circulating the residual current of the phase winding, wherein said first phase switch is maintained at the turn-off state and said one of the common switches is changed from the turn-off state to the turn-on state and again to the turn-off state to be operated in the operation mode 3, the operation mode 2, and again in the operation mode 3, thereby returning the residual current of the phase winding to the power supply side.

9. A switching control method for a two phase switch reluctance motor (SRM), comprising:

controlling, by a microprocessor, an active converter including a plurality of switches bridge-connected at each phase winding of a two phase SRM, a plurality of current feedback diodes each connected to the switches, and a pair of driver operated as operation modes 1 to 3 splitting and controlling the plurality of switches, to excite any one of the phase windings and remove residual current; and controlling, by the microprocessor, the active converter to excite the other one phase winding and remove the residual current, wherein the operation mode 1 applies positive reference voltage to a corresponding phase winding of the two phase SRM to increase current flowing in the winding, the operation mode 2 circulates current to the winding when current flows in the winding to slowly reduce current, and the operation mode 3 applies negative reference voltage to the phase winding to rapidly reduce current, and wherein for the active converter, one of the switches maintains a turn-on state for a predetermined time and the other one of the switches is changed from a turn-on state to a turn-off state and again to a turn-on state during the period to change the operation mode from the operation mode 1 to the operation mode 2 and again to the operation mode 1 to apply the reference voltage to one of the phase windings, thereby exciting the one of the phase windings.

10. The switching control method for a two phase switch reluctance motor as set forth in claim 9, wherein the pair of drivers is configured to include a first driver and a second driver, the first driver controls switches positioned at one side of the two phase SRM, and the second driver controls switches positioned at the other side of the two phase SRM.

11. The switching control method for a two phase switch reluctance motor as set forth in claim 9, wherein the plurality of switches include:

a pair of common switches commonly connected to two phase windings of two phase SRMs;

a pair of first phase switches bridge-connected to the pair of common switches at any one of the two phase windings; and a pair of second phase switches bridge-connected to the pair of common switches at the other one of the two phase windings.

12. The switching control method for a two phase switch reluctance motor as set forth in claim 9, wherein thereafter said one of the switches is changed to a turn-off state and then, a turn-on state and again to a turn-off state and said one of the other switches is reversely operated to be in the operation mode 2, thereby circulating the residual current of the phase winding, wherein said one of the other switches is maintained at the turn-off state and said one of the switches is changed from the turn-off state to the turn-on state and again to the turn-off state to be operated in the operation mode 3, the operation mode 2, and again in the operation mode 3, thereby returning the residual current of the phase winding to the power supply side.

* * * * *